(12) United States Patent
Graziosi et al.

(10) Patent No.: US 12,315,081 B2
(45) Date of Patent: May 27, 2025

(54) MESH PATCH SUB-DIVISION

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 276 days.

(21) Appl. No.: 17/987,836

(22) Filed: Nov. 15, 2022

(65) Prior Publication Data

US 2023/0306683 A1   Sep. 28, 2023

Related U.S. Application Data

(60) Provisional application No. 63/269,906, filed on Mar. 25, 2022.

(51) Int. Cl.
*G06T 17/00* (2006.01)
*G06T 9/00* (2006.01)
*G06T 17/20* (2006.01)

(52) U.S. Cl.
CPC .............. *G06T 17/20* (2013.01); *G06T 9/00* (2013.01)

(58) Field of Classification Search
None
See application file for complete search history.

(56) References Cited

U.S. PATENT DOCUMENTS 6,184,897 B1 * 2/2001 Gueziec ............... G06T 17/20
345/440
6,262,737 B1 * 7/2001 Li ...................... G06T 17/20
375/E7.092

(Continued)

FOREIGN PATENT DOCUMENTS

WO    WO-2021116838 A1    6/2021

OTHER PUBLICATIONS

Danillo B Graziosi (Sony) et al: "[V-CG] Sony's Dynamic Mesh Coding Call for Proposal Response", 138. MPEG Meeting; Apr. 25, 2022-Apr. 29, 2022; Online; (Motion Picture Expert Group or ISO/IEC JTC1/SC29/WG11) 1 No. m59284 Mar. 25, 2022 (Mar. 25, 2022) 1 XP030300727, [retrieved on Mar. 25, 2022] sect.ion I.c.iv.

(Continued)

*Primary Examiner* — Martin Mushambo
(74) *Attorney, Agent, or Firm* — Haverstock & Owens, A Law Corporation

(57) ABSTRACT

Ways to post-process a decoded mesh and modify received triangles per patch to improve the mesh geometry are described herein. Since the transmitted geometry contains the high-resolution surface information, the information is able to be applied to the mesh reconstruction operation to generate triangles that are aligned with the original surface. Methods include generating new triangles by splitting the received triangles' edges according to their size, by inserting new vertices at the triangle's centroids, by splitting the vertices, and by performing marching cubes in surfaces defined by the geometry images.

42 Claims, 6 Drawing Sheets

(56) References Cited

U.S. PATENT DOCUMENTS

| | | | | |
|---|---|---|---|---|
| 6,879,324 | B1* | 4/2005 | Hoppe | G06T 17/205 |
| | | | | 345/428 |
| 7,928,990 | B2* | 4/2011 | Jiao | G06T 15/005 |
| | | | | 345/557 |
| 10,902,675 | B2* | 1/2021 | Rockwood | G06T 17/20 |
| 11,127,223 | B1* | 9/2021 | Bhushan | G06T 17/20 |
| 11,423,617 | B2* | 8/2022 | Kim | G06N 3/08 |
| 11,544,904 | B1* | 1/2023 | Bhushan | G06T 17/20 |
| 11,551,421 | B1* | 1/2023 | Bhushan | G06T 19/20 |
| 11,907,617 | B2* | 2/2024 | Rockwood | G06F 30/00 |
| 2002/0186216 | A1* | 12/2002 | Baumberg | G06T 17/20 |
| | | | | 345/422 |
| 2004/0207622 | A1* | 10/2004 | Deering | G06T 15/50 |
| | | | | 345/426 |
| 2007/0078636 | A1* | 4/2007 | Elsberg | G06F 30/13 |
| | | | | 703/2 |
| 2008/0218513 | A1* | 9/2008 | Kaus | G06T 17/20 |
| | | | | 345/423 |
| 2012/0200569 | A1* | 8/2012 | Munkberg | G06T 17/205 |
| | | | | 345/423 |
| 2012/0229445 | A1* | 9/2012 | Jenkins | G06T 15/405 |
| | | | | 345/418 |
| 2012/0256915 | A1* | 10/2012 | Jenkins | G06T 15/40 |
| | | | | 345/419 |
| 2013/0024545 | A1* | 1/2013 | Sheppard | H04N 21/234318 |
| | | | | 709/217 |
| 2013/0342527 | A1* | 12/2013 | Molyneaux | G06T 13/40 |
| | | | | 345/419 |
| 2015/0269770 | A1* | 9/2015 | Jenkins | G06T 15/20 |
| | | | | 345/421 |
| 2016/0014392 | A1* | 1/2016 | Liang | G06T 7/11 |
| | | | | 348/47 |
| 2019/0215486 | A1* | 7/2019 | Venshtain | H04N 13/243 |
| 2020/0020157 | A1* | 1/2020 | Powers | G06T 19/006 |
| 2020/0257306 | A1* | 8/2020 | Nisenzon | G06V 20/56 |
| 2020/0368616 | A1* | 11/2020 | Delamont | H04N 13/239 |
| 2021/0304442 | A1* | 9/2021 | Kocdemir | G06T 9/001 |
| 2021/0375046 | A1* | 12/2021 | Shanmuganathan | |
| | | | | H04N 13/128 |
| 2022/0065620 | A1* | 3/2022 | Fanello | G01B 11/2513 |
| 2023/0290063 | A1* | 9/2023 | Mammou | G06T 17/205 |
| 2023/0298217 | A1* | 9/2023 | Rondao Alface | H04N 21/816 |
| | | | | 382/232 |

OTHER PUBLICATIONS

Faramarzi Esmaeil et al: "Mesh Coding Extensions To MPEG-1 V-PCC", 2020 IEEE 22nd International Workshop on Multimedia Signal Processing (MMSP), Sep. 21, 2020 (Sep. 21, 2020), pp. 1-5, XP055837185.

Rossignac J: "Compiessed Progressive Meshes", IEEE Transactions On Visualization And Computer Graphics, IEEE, USA, vol. 6, No. 1 1 Jan. 1, 2000 (Jan. 1, 2000), pp. 79-93, XP008113948, ISSN: 1077-2626 1 DOI:10.1109/2945.841122 section 3 figure 2.

Warren Joe et al: "Chapter 7—Averaging Schemes for Polyhedral Meshes" In: "Subdivision Methods for Geometric Design", Nov. 1, 2001 (Nov. 1, 2001), Elsevier, XP093044881, ISBN: 978-1-55860-446-9 pp. 198-238, sections 7.1.1, 7.1.2, 7.4.1.

* cited by examiner

MESH PATCH SUB-DIVISION

CROSS-REFERENCE TO RELATED APPLICATION(S)

This application claims priority under 35 U.S.C. § 119(e) of the U.S. Provisional Patent Application Ser. No. 63/269,906, filed Mar. 25, 2022 and titled, "MESH PATCH SUB-DIVISION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

Ways to post-process a decoded mesh and modify received triangles per patch to improve the mesh geometry are described herein. Since the transmitted geometry contains the high-resolution surface information, the information is able to be applied to the mesh reconstruction operation to generate triangles that are aligned with the original surface. Methods include generating new triangles by splitting the received triangles' edges according to their size, by inserting new vertices at the triangle's centroids, by splitting the vertices, and by performing marching cubes in surfaces defined by the geometry images.

In one aspect, a method programmed in a non-transitory memory of a device comprises receiving a face list and a vertex list, receiving a high resolution depth map, implementing patch mesh subdivision to generate a new face list and a new vertex list and implementing three dimensional reconstruction with the new face list and the new vertex list to generate a decoded mesh object. Implementing patch mesh subdivision to generate the new face list and the new vertex list includes: a triangle centroid implementation by placing a point in the middle of each triangle which is used to generate new triangles by drawing lines from the point to each vertex of the triangle. A location of the point is obtained using the high resolution depth map. Implementing patch mesh subdivision to generate the new face list and the new vertex list includes: an edge midpoint implementation by placing a point in the middle of each edge of a triangle and drawing a line from each point to another middle point of the triangle to generate four triangles. A three dimensional location of each point is obtained using the high resolution depth map. Implementing patch mesh subdivision to generate the new face list and the new vertex list includes: a vertex split implementation by removing edges, adding a vertex and drawing lines from existing vertices to the added vertex. The added vertex is placed based on three dimensional location information from the high resolution depth map. Implementing patch mesh subdivision to generate the new face list and the new vertex list includes: a marching cubes implementation by generating points between border triangles using marching cubes. Voxel information in a three dimensional space is obtained from the high resolution depth map.

In another aspect, an apparatus comprises a non-transitory memory for storing an application, the application for: receiving a face list and a vertex list, receiving a high resolution depth map, implementing patch mesh subdivision to generate a new face list and a new vertex list and implementing three dimensional reconstruction with the new face list and the new vertex list to generate a decoded mesh object and a processor coupled to the memory, the processor configured for processing the application. Implementing patch mesh subdivision to generate the new face list and the new vertex list includes: a triangle centroid implementation by placing a point in the middle of each triangle which is used to generate new triangles by drawing lines from the point to each vertex of the triangle. A location of the point is obtained using the high resolution depth map. Implementing patch mesh subdivision to generate the new face list and the new vertex list includes: an edge midpoint implementation by placing a point in the middle of each edge of a triangle and drawing a line from each point to another middle point of the triangle to generate four triangles. A three dimensional location of each point is obtained using the high resolution depth map. Implementing patch mesh subdivision to generate the new face list and the new vertex list includes: a vertex split implementation by removing edges, adding a vertex and drawing lines from existing vertices to the added vertex. The added vertex is placed based on three dimensional location information from the high resolution depth map. Implementing patch mesh subdivision to generate the new face list and the new vertex list includes: a marching cubes implementation by generating points between border triangles using marching cubes. Voxel information in a three dimensional space is obtained from the high resolution depth map.

In another aspect, a system comprises an encoder configured for: encoding content including a face list and a vertex list and a decoder configured for: receiving the face list and the vertex list, receiving a high resolution depth map, implementing patch mesh subdivision to generate a new face list and a new vertex list and implementing three dimensional reconstruction with the new face list and the new vertex list to generate a decoded mesh object. Implementing patch mesh subdivision to generate the new face list and the new vertex list includes: a triangle centroid implementation by placing a point in the middle of each triangle which is used to generate new triangles by drawing lines from the point to each vertex of the triangle. A location of the point is obtained using the high resolution depth map. Implementing patch mesh subdivision to generate the new face list and the new vertex list includes: an edge midpoint implementation by placing a point in the middle of each edge of a triangle and drawing a line from each point to another middle point of the triangle to generate four triangles. A three dimensional location of each point is obtained using the high resolution depth map.

Implementing patch mesh subdivision to generate the new face list and the new vertex list includes: a vertex split implementation by removing edges, adding a vertex and drawing lines from existing vertices to the added vertex. The added vertex is placed based on three dimensional location information from the high resolution depth map. Implementing patch mesh subdivision to generate the new face list and the new vertex list includes: a marching cubes implementation by generating points between border triangles using marching cubes. Voxel information in a three dimensional space is obtained from the high resolution depth map.

DETAILED DESCRIPTION OF THE PREFERRED EMBODIMENT

Ways to post-process a decoded mesh and modify received triangles per patch to improve the mesh geometry are described herein. Since the transmitted geometry contains the high-resolution surface information, the information is able to be applied to the mesh reconstruction operation to generate triangles that are aligned with the original surface. Methods include generating new triangles by splitting the received triangles' edges according to their size, by inserting new vertices at the triangle's centroids, by splitting the vertices, and by performing marching cubes in surfaces defined by the geometry images.

Figure 1:
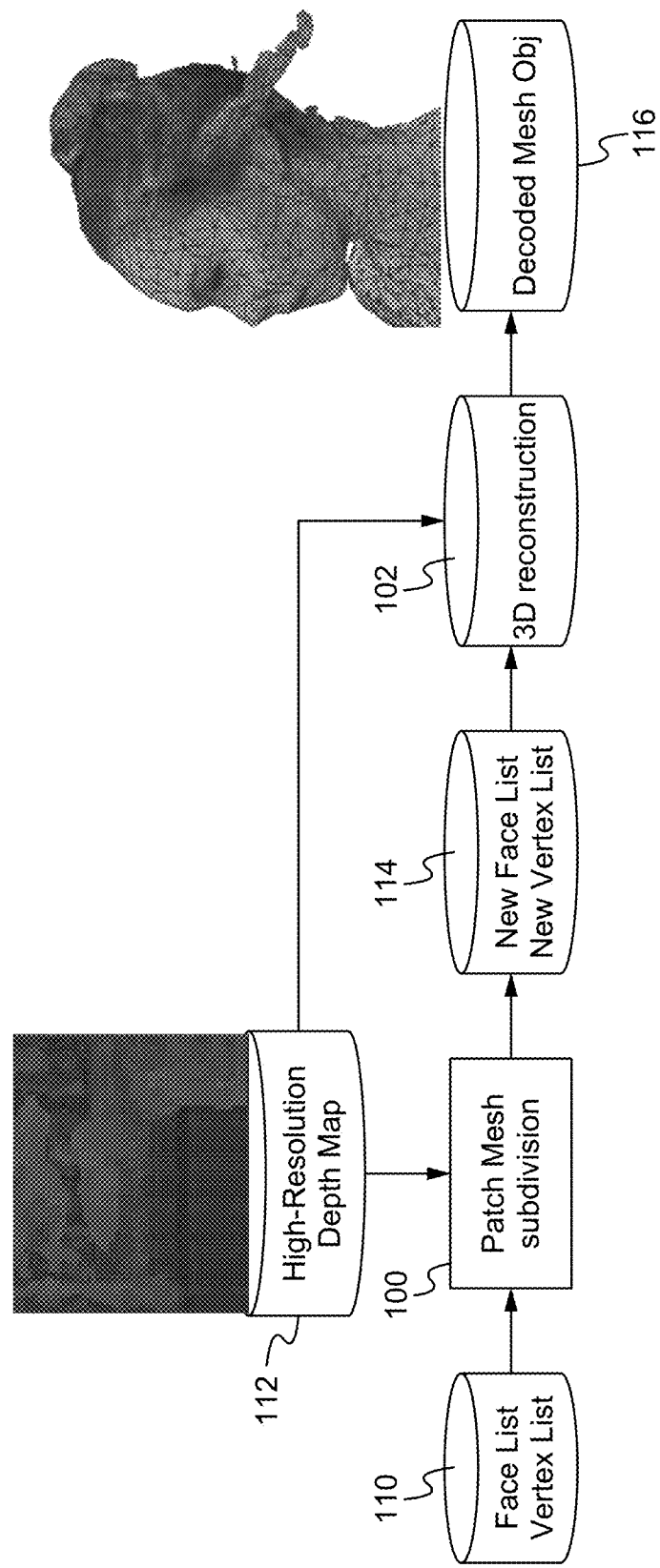
FIG. 1 illustrates a flowchart of decoding content according to some embodiments.

FIG. 1 illustrates a flowchart of decoding content according to some embodiments. On the decoder side, a face list and vertex list 110 are received. The decoder also receives a high resolution depth map 112. The high resolution depth map 112 is able to be used to generate a new face list and new vertex list 114 based on the received face list and vertex list 110 using patch mesh subdivision, in the step 100. With the high resolution depth map 112, the new face list and the new vertex list 110, a decoded mesh object 116 is able to be generated using 3D reconstruction, in the step 102. In some embodiments, fewer or additional steps are implemented. In some embodiments, the order of the steps is modified.

Figure 2:
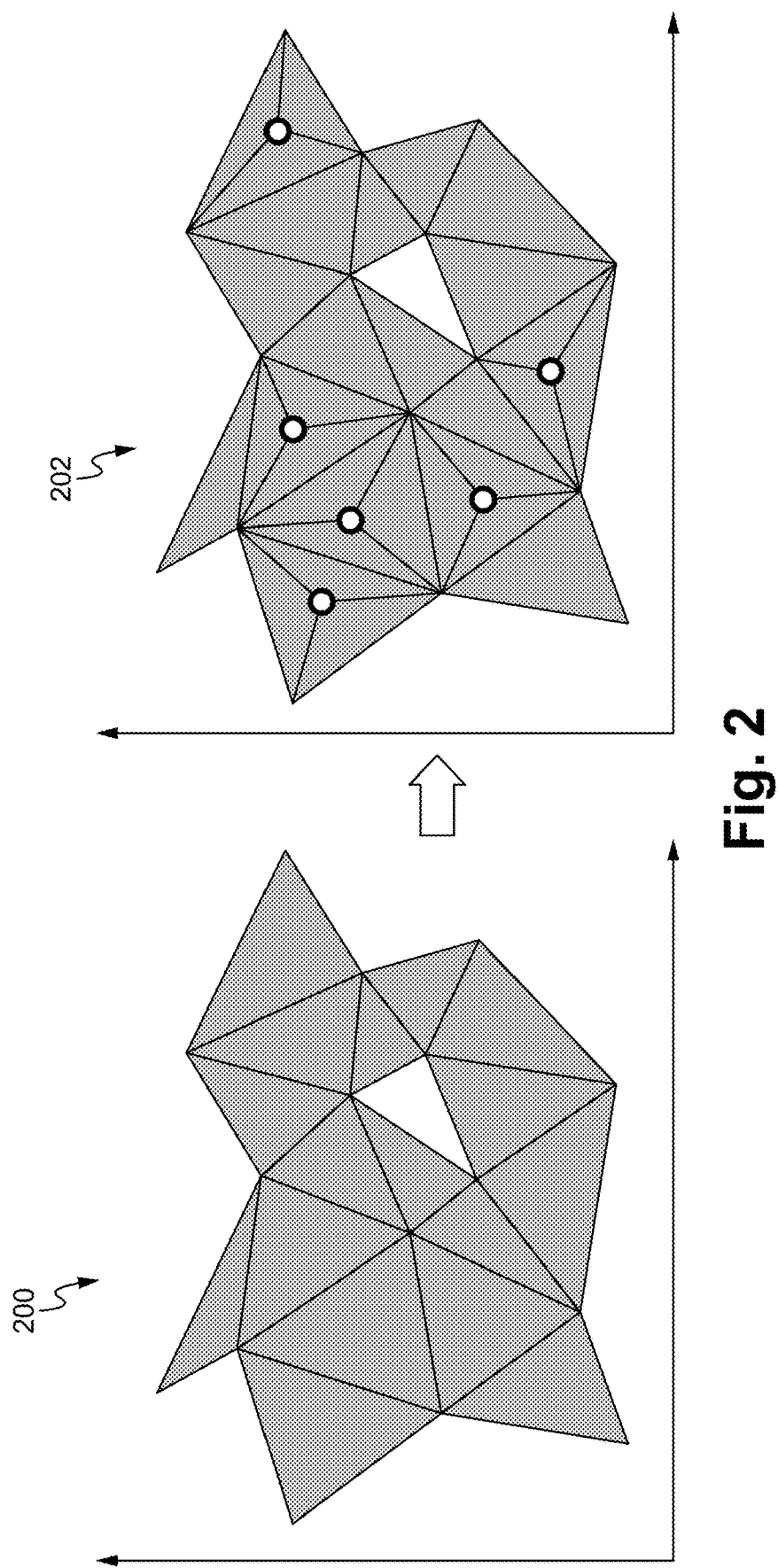
FIG. 2 illustrates a diagram of a triangle centroid implementation according to some embodiments.

FIG. 2 illustrates a diagram of a triangle centroid implementation according to some embodiments. The triangle list (e.g., face and vertex lists) is received as represented in image 200. Points are generated/placed in the triangles (e.g., in the middle of each triangle such that it is equidistant to the triangle's vertices) as represented in image 202. The point placed in each triangle is able to be used to generate new triangles by generating/drawing lines from the point to each vertex of the triangle. Thus, each triangle with a point placed inside will be divided into three new triangles. Triangles at the edges do not change (e.g., the centroids are only used for non-edge triangles). The 3D locations of each of the points (centroids) are obtained using the high resolution depth map. For example, the high resolution depth map is able to be used to determine the depth the centroid is at (e.g., if the point is the same depth or a different depth when compared with the vertices of the triangle). The new triangles are used to generate a new face list and vertex list. The new face list and vertex list based on the triangle centroid implementation are able to be used to reconstruct the mesh object.

Figure 3:
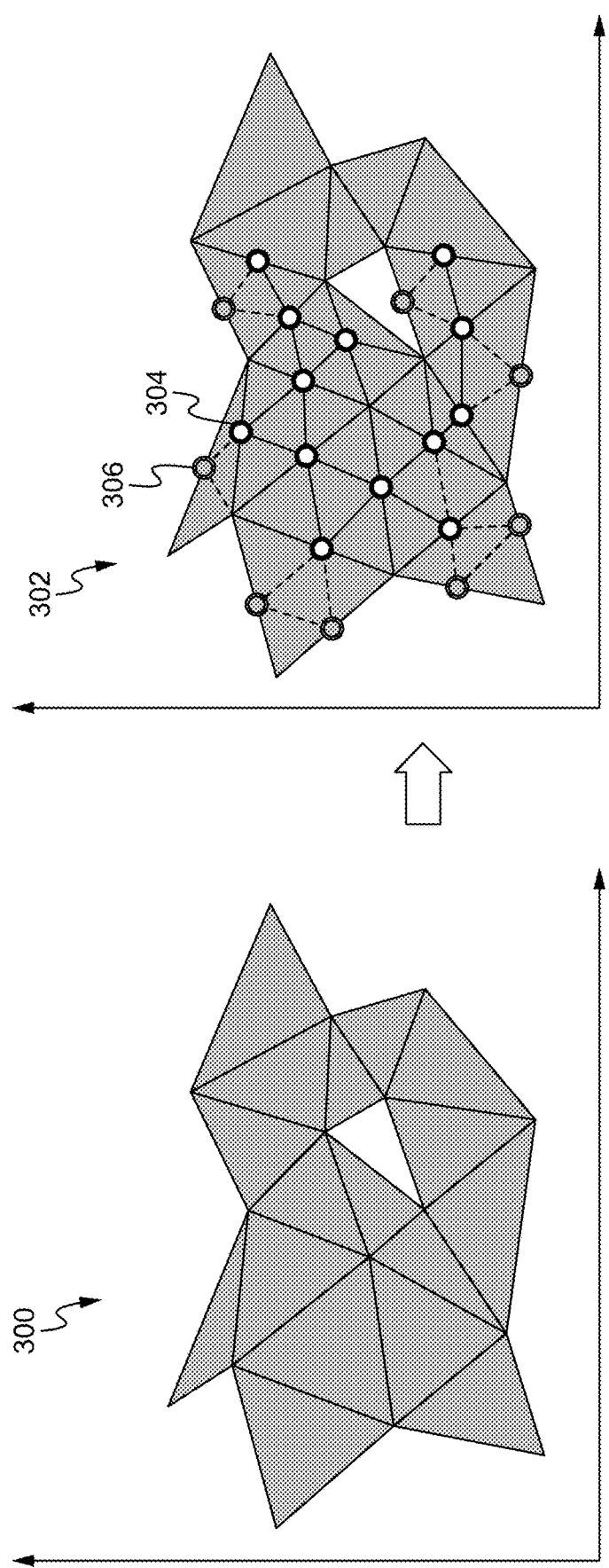
FIG. 3 illustrates a diagram of an edge midpoint implementation according to some embodiments.

FIG. 3 illustrates a diagram of an edge midpoint implementation according to some embodiments. The triangle list is received as represented in image 300. Points (e.g., vertices) are generated/placed in the middle (or at some other position) of each edge of some of the triangles as represented in image 302. Each edge (with some exceptions) is divided (in the middle), and a line is generated/drawn from one (middle) point to another (middle) point which turns each triangle into 4 triangles. Edges at a patch boundary are not allowed to be split. For example, the lighter dots 304 represent new vertices after edge division, and the darker dots 306 represent vertices that are not permitted. The 3D locations of each of the points are obtained using the high resolution depth map. For example, the high resolution depth map is able to be used to determine if the point is the same depth or a different depth when compared with the vertices of the triangle. The new triangles are used to generate a new face list and vertex list. The new face list and vertex list based on the edge midpoint implementation are able to be used to reconstruct the mesh object.

Figure 4:
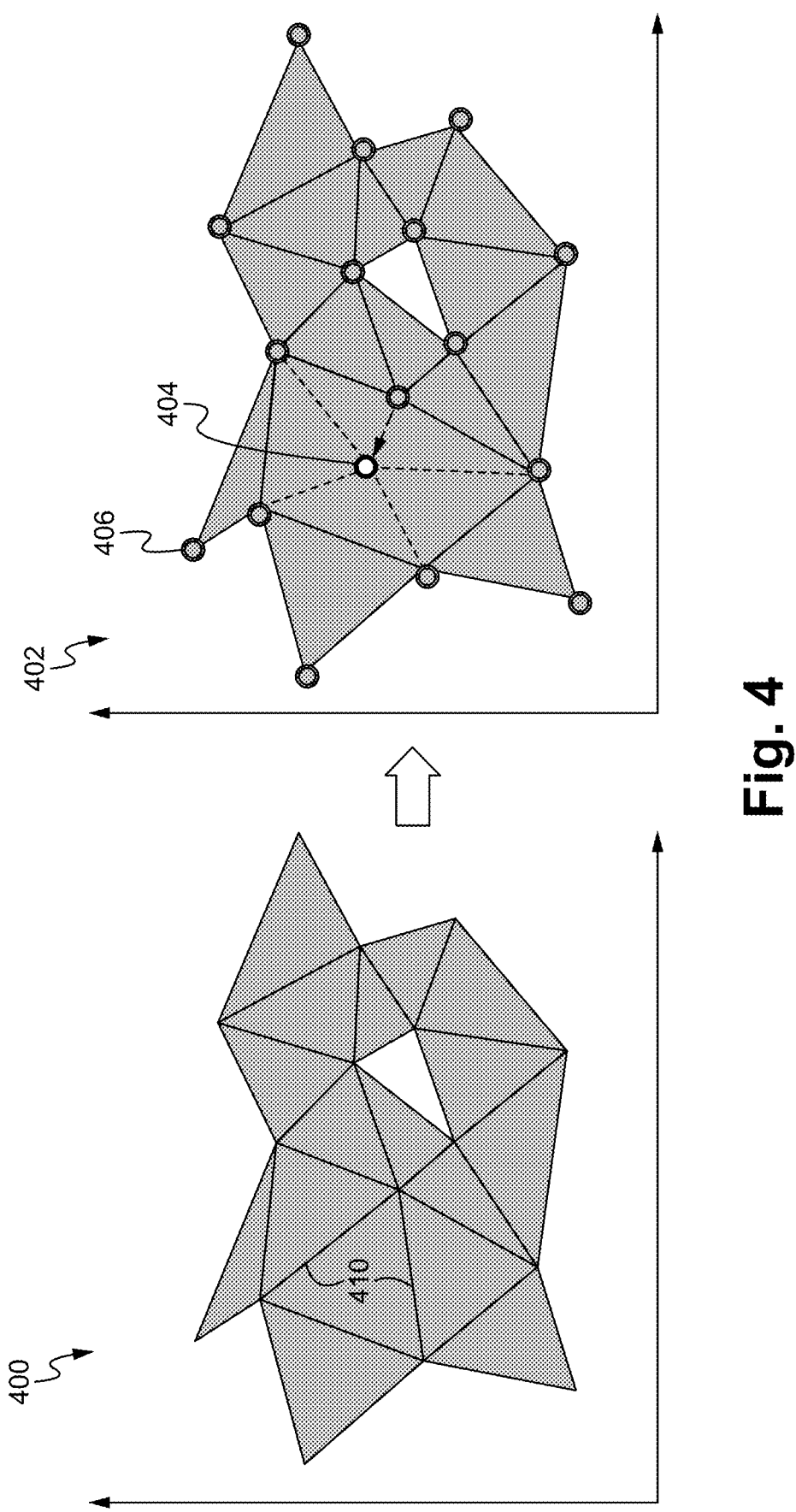
FIG. 4 illustrates a diagram of a vertex split implementation according to some embodiments.

FIG. 4 illustrates a diagram of a vertex split implementation according to some embodiments. The triangle list is received as represented in image 400. Edges are split or removed, and then new edges are generated for some of the triangles as represented in image 402. For example, two edges 410 of a triangle are removed, and then a new vertex 404 is placed based on 3D location information from the high resolution depth map. Edges are generated/drawn from the initial vertices 406 to the new vertex 404 to generate new triangles. The new triangles are used to generate a new face list and vertex list. The new face list and vertex list based on the vertex split implementation are able to be used to reconstruct the mesh object.

Figure 5:
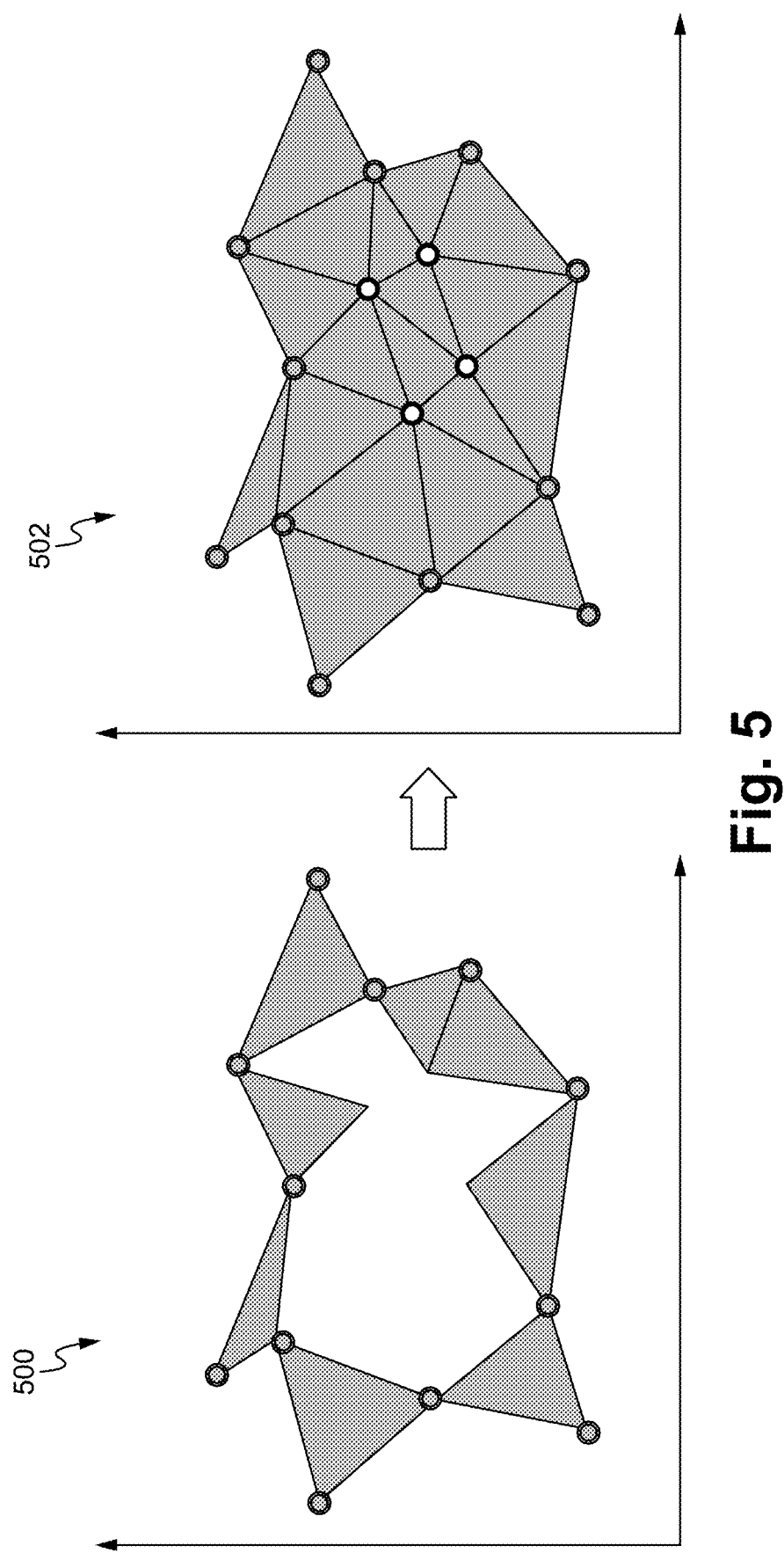
FIG. 5 illustrates a diagram of a marching cubes implementation according to some embodiments.

FIG. 5 illustrates a diagram of a marching cubes implementation according to some embodiments. Marching cubes is a technique used for surface reconstruction. When only the triangles at the border are sent (as shown in image 500), the points in the middle are able to be generated using marching cubes as shown in image 502. The 3D location information from the high resolution depth map is also used in determining the locations of the new vertices. For marching cubes, voxel information in the 3D space is obtained from the high resolution depth map. The new triangles are used to generate a new face list and vertex list. The new face list and vertex list based on the marching cubes implementation are able to be used to reconstruct the mesh object.

Figure 6:
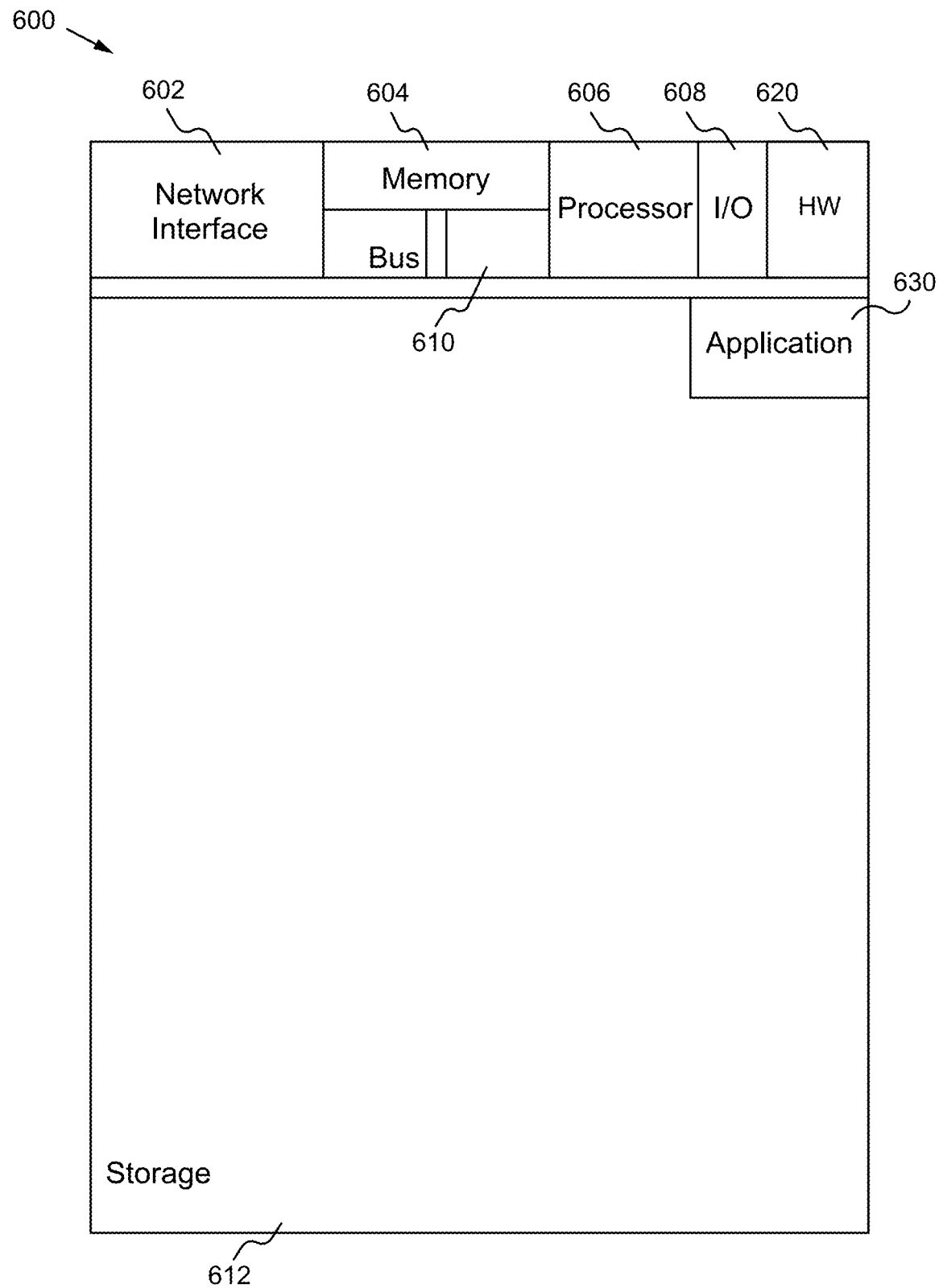
FIG. 6 illustrates a block diagram of an exemplary computing device configured to implement the mesh patch sub-division method according to some embodiments.

FIG. 6 illustrates a block diagram of an exemplary computing device configured to implement the mesh patch sub-division method according to some embodiments. The computing device 600 is able to be used to acquire, store, compute, process, communicate and/or display information such as images and videos including 3D content. The computing device 600 is able to implement any of the encoding/decoding aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Mesh patch sub-division application(s) 630 used to implement the mesh patch sub-division implementation are likely to be stored in the storage device 612 and memory 604 and processed as applications are typically processed. More or fewer components shown in FIG. 6 are able to be included in the computing device 600. In some embodiments, mesh patch sub-division hardware 620 is included. Although the computing device 600 in FIG. 6 includes applications 630 and hardware 620 for the mesh patch sub-division implementation, the mesh patch sub-division method is able to be implemented on a computing device in hardware, firmware, software or any combination thereof. For example, in some embodiments, the mesh patch sub-division applications 630 are programmed in a memory and executed using a processor. In another example, in some embodiments, the mesh patch sub-division hardware 620 is programmed hardware logic including gates specifically designed to implement the mesh patch sub-division method.

In some embodiments, the mesh patch sub-division application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the mesh patch sub-division method, a device acquires or receives 3D content (e.g., point cloud content). The mesh patch sub-division method is able to be implemented with user assistance or automatically without user involvement.

In operation, the mesh patch sub-division method enables more efficient and more accurate 3D content decoding compared to previous implementations.

Some Embodiments of Mesh Patch Sub-Division

1. A method programmed in a non-transitory memory of a device comprising: receiving a face list and a vertex list;
   receiving a high resolution depth map;
   implementing patch mesh subdivision to generate a new face list and a new vertex list; and
   implementing three dimensional reconstruction with the new face list and the new vertex list to generate a decoded mesh object.
2. The method of clause 1 wherein implementing patch mesh subdivision to generate the new face list and the new vertex list includes: a triangle centroid implementation by placing a point in the middle of each triangle which is used to generate new triangles by drawing lines from the point to each vertex of the triangle.
3. The method of clause 2 wherein a location of the point is obtained using the high resolution depth map.
4. The method of clause 1 wherein implementing patch mesh subdivision to generate the new face list and the new vertex list includes: an edge midpoint implementation by placing a point in the middle of each edge of a triangle and drawing a line from each point to another middle point of the triangle to generate four triangles.
5. The method of clause 4 wherein a three dimensional location of each point is obtained using the high resolution depth map.
6. The method of clause 1 wherein implementing patch mesh subdivision to generate the new face list and the new vertex list includes: a vertex split implementation by removing edges, adding a vertex and drawing lines from existing vertices to the added vertex.
7. The method of clause 6 wherein the added vertex is placed based on three dimensional location information from the high resolution depth map.
8. The method of clause 1 wherein implementing patch mesh subdivision to generate the new face list and the new vertex list includes: a marching cubes implementation by generating points between border triangles using marching cubes.
9. The method of clause 8 wherein voxel information in a three dimensional space is obtained from the high resolution depth map.
10. An apparatus comprising:
    a non-transitory memory for storing an application, the application for:

receiving a face list and a vertex list;
receiving a high resolution depth map;
implementing patch mesh subdivision to generate a new face list and a new vertex list; and
implementing three dimensional reconstruction with the new face list and the new vertex list to generate a decoded mesh object; and
a processor coupled to the memory, the processor configured for processing the application.

11. The apparatus of clause 10 wherein implementing patch mesh subdivision to generate the new face list and the new vertex list includes: a triangle centroid implementation by placing a point in the middle of each triangle which is used to generate new triangles by drawing lines from the point to each vertex of the triangle.

12. The apparatus of clause 11 wherein a location of the point is obtained using the high resolution depth map.

13. The apparatus of clause 10 wherein implementing patch mesh subdivision to generate the new face list and the new vertex list includes: an edge midpoint implementation by placing a point in the middle of each edge of a triangle and drawing a line from each point to another middle point of the triangle to generate four triangles.

14. The apparatus of clause 13 wherein a three dimensional location of each point is obtained using the high resolution depth map.

15. The apparatus of clause 10 wherein implementing patch mesh subdivision to generate the new face list and the new vertex list includes: a vertex split implementation by removing edges, adding a vertex and drawing lines from existing vertices to the added vertex.

16. The apparatus of clause 15 wherein the added vertex is placed based on three dimensional location information from the high resolution depth map.

17. The apparatus of clause 10 wherein implementing patch mesh subdivision to generate the new face list and the new vertex list includes: a marching cubes implementation by generating points between border triangles using marching cubes.

18. The apparatus of clause 17 wherein voxel information in a three dimensional space is obtained from the high resolution depth map.

19. A system comprising:
an encoder configured for:
encoding content including a face list and a vertex list; and
a decoder configured for:
receiving the face list and the vertex list;
receiving a high resolution depth map;
implementing patch mesh subdivision to generate a new face list and a new vertex list; and
implementing three dimensional reconstruction with the new face list and the new vertex list to generate a decoded mesh object.

20. The system of clause 19 wherein implementing patch mesh subdivision to generate the new face list and the new vertex list includes: a triangle centroid implementation by placing a point in the middle of each triangle which is used to generate new triangles by drawing lines from the point to each vertex of the triangle.

21. The system of clause 20 wherein a location of the point is obtained using the high resolution depth map.

22. The system of clause 19 wherein implementing patch mesh subdivision to generate the new face list and the new vertex list includes: an edge midpoint implementation by placing a point in the middle of each edge of a triangle and drawing a line from each point to another middle point of the triangle to generate four triangles.

23. The system of clause 22 wherein a three dimensional location of each point is obtained using the high resolution depth map.

24. The system of clause 19 wherein implementing patch mesh subdivision to generate the new face list and the new vertex list includes: a vertex split implementation by removing edges, adding a vertex and drawing lines from existing vertices to the added vertex.

25. The system of clause 24 wherein the added vertex is placed based on three dimensional location information from the high resolution depth map.

26. The system of clause 19 wherein implementing patch mesh subdivision to generate the new face list and the new vertex list includes: a marching cubes implementation by generating points between border triangles using marching cubes.

27. The system of clause 26 wherein voxel information in a three dimensional space is obtained from the high resolution depth map.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
receiving a face list and a vertex list;
receiving a high resolution depth map;
implementing patch mesh subdivision to generate a new face list and a new vertex list, wherein implementing patch mesh subdivision to generate the new face list and the new vertex list includes: a vertex split implementation by removing edges, adding a vertex and drawing lines from existing vertices to the added vertex; and
implementing three dimensional reconstruction with the new face list and the new vertex list to generate a decoded mesh object.

2. The method of claim 1 wherein implementing patch mesh subdivision to generate the new face list and the new vertex list includes: a triangle centroid implementation by placing a point in the middle of each triangle which is used to generate new triangles by drawing lines from the point to each vertex of the triangle.

3. The method of claim 2 wherein a location of the point is obtained using the high resolution depth map.

4. The method of claim 1 wherein implementing patch mesh subdivision to generate the new face list and the new vertex list includes: an edge midpoint implementation by placing a point in the middle of each edge of a triangle and drawing a line from each point to another middle point of the triangle to generate four triangles.

5. The method of claim 4 wherein a three dimensional location of each point is obtained using the high resolution depth map.

6. The method of claim 1 wherein the added vertex is placed based on three dimensional location information from the high resolution depth map.

7. The method of claim 1 wherein implementing patch mesh subdivision to generate the new face list and the new vertex list includes: a marching cubes implementation by generating points between border triangles using marching cubes.

8. The method of claim 7 wherein voxel information in a three dimensional space is obtained from the high resolution depth map.

9. An apparatus comprising:
a non-transitory memory for storing an application, the application for:
receiving a face list and a vertex list;
receiving a high resolution depth map;
implementing patch mesh subdivision to generate a new face list and a new vertex list, wherein implementing patch mesh subdivision to generate the new face list and the new vertex list includes: a vertex split implementation by removing edges, adding a vertex and drawing lines from existing vertices to the added vertex; and
implementing three dimensional reconstruction with the new face list and the new vertex list to generate a decoded mesh object; and
a processor coupled to the memory, the processor configured for processing the application.

10. The apparatus of claim 9 wherein implementing patch mesh subdivision to generate the new face list and the new vertex list includes: a triangle centroid implementation by placing a point in the middle of each triangle which is used to generate new triangles by drawing lines from the point to each vertex of the triangle.

11. The apparatus of claim 10 wherein a location of the point is obtained using the high resolution depth map.

12. The apparatus of claim 9 wherein implementing patch mesh subdivision to generate the new face list and the new vertex list includes: an edge midpoint implementation by placing a point in the middle of each edge of a triangle and drawing a line from each point to another middle point of the triangle to generate four triangles.

13. The apparatus of claim 12 wherein a three dimensional location of each point is obtained using the high resolution depth map.

14. The apparatus of claim 9 wherein the added vertex is placed based on three dimensional location information from the high resolution depth map.

15. The apparatus of claim 9 wherein implementing patch mesh subdivision to generate the new face list and the new vertex list includes: a marching cubes implementation by generating points between border triangles using marching cubes.

16. The apparatus of claim 15 wherein voxel information in a three dimensional space is obtained from the high resolution depth map.

17. A system comprising:
an encoder configured for:
encoding content including a face list and a vertex list; and
a decoder configured for:
receiving the face list and the vertex list;
receiving a high resolution depth map;
implementing patch mesh subdivision to generate a new face list and a new vertex list, wherein implementing patch mesh subdivision to generate the new face list and the new vertex list includes: a vertex split implementation by removing edges, adding a vertex and drawing lines from existing vertices to the added vertex; and
implementing three dimensional reconstruction with the new face list and the new vertex list to generate a decoded mesh object.

18. The system of claim 17 wherein implementing patch mesh subdivision to generate the new face list and the new vertex list includes: a triangle centroid implementation by placing a point in the middle of each triangle which is used to generate new triangles by drawing lines from the point to each vertex of the triangle.

19. The system of claim 18 wherein a location of the point is obtained using the high resolution depth map.

20. The system of claim 17 wherein implementing patch mesh subdivision to generate the new face list and the new vertex list includes: an edge midpoint implementation by placing a point in the middle of each edge of a triangle and drawing a line from each point to another middle point of the triangle to generate four triangles.

21. The system of claim 20 wherein a three dimensional location of each point is obtained using the high resolution depth map.

22. The system of claim 17 wherein the added vertex is placed based on three dimensional location information from the high resolution depth map.

23. The system of claim 17 wherein implementing patch mesh subdivision to generate the new face list and the new vertex list includes: a marching cubes implementation by generating points between border triangles using marching cubes.

24. The system of claim 23 wherein voxel information in a three dimensional space is obtained from the high resolution depth map.

25. A method programmed in a non-transitory memory of a device comprising:
receiving a face list and a vertex list;
receiving a high resolution depth map;
implementing patch mesh subdivision to generate a new face list and a new vertex list, wherein implementing patch mesh subdivision to generate the new face list and the new vertex list includes: a marching cubes implementation by generating points between border triangles using marching cubes; and
implementing three dimensional reconstruction with the new face list and the new vertex list to generate a decoded mesh object.

26. The method of claim 25 wherein implementing patch mesh subdivision to generate the new face list and the new vertex list includes: a triangle centroid implementation by placing a point in the middle of each triangle which is used to generate new triangles by drawing lines from the point to each vertex of the triangle.

27. The method of claim 26 wherein a location of the point is obtained using the high resolution depth map.

28. The method of claim 25 wherein implementing patch mesh subdivision to generate the new face list and the new vertex list includes: an edge midpoint implementation by placing a point in the middle of each edge of a triangle and drawing a line from each point to another middle point of the triangle to generate four triangles.

29. The method of claim 28 wherein a three dimensional location of each point is obtained using the high resolution depth map.

30. The method of claim 25 wherein voxel information in a three dimensional space is obtained from the high resolution depth map.

31. An apparatus comprising:
a non-transitory memory for storing an application, the application for:
receiving a face list and a vertex list;
receiving a high resolution depth map;
implementing patch mesh subdivision to generate a new face list and a new vertex list, wherein implementing patch mesh subdivision to generate the new face list and the new vertex list includes: a marching cubes implementation by generating points between border triangles using marching cubes; and
implementing three dimensional reconstruction with the new face list and the new vertex list to generate a decoded mesh object; and
a processor coupled to the memory, the processor configured for processing the application.

32. The apparatus of claim 31 wherein implementing patch mesh subdivision to generate the new face list and the new vertex list includes: a triangle centroid implementation by placing a point in the middle of each triangle which is used to generate new triangles by drawing lines from the point to each vertex of the triangle.

33. The apparatus of claim 32 wherein a location of the point is obtained using the high resolution depth map.

34. The apparatus of claim 31 wherein implementing patch mesh subdivision to generate the new face list and the new vertex list includes: an edge midpoint implementation by placing a point in the middle of each edge of a triangle and drawing a line from each point to another middle point of the triangle to generate four triangles.

35. The apparatus of claim 34 wherein a three dimensional location of each point is obtained using the high resolution depth map.

36. The apparatus of claim 31 wherein voxel information in a three dimensional space is obtained from the high resolution depth map.

37. A system comprising:
an encoder configured for:
encoding content including a face list and a vertex list; and
a decoder configured for:
receiving the face list and the vertex list;
receiving a high resolution depth map;
implementing patch mesh subdivision to generate a new face list and a new vertex list, wherein implementing patch mesh subdivision to generate the new face list and the new vertex list includes: a marching cubes implementation by generating points between border triangles using marching cubes; and
implementing three dimensional reconstruction with the new face list and the new vertex list to generate a decoded mesh object.

38. The system of claim 37 wherein implementing patch mesh subdivision to generate the new face list and the new vertex list includes: a triangle centroid implementation by placing a point in the middle of each triangle which is used to generate new triangles by drawing lines from the point to each vertex of the triangle.

39. The system of claim 38 wherein a location of the point is obtained using the high resolution depth map.

40. The system of claim 37 wherein implementing patch mesh subdivision to generate the new face list and the new vertex list includes: an edge midpoint implementation by placing a point in the middle of each edge of a triangle and drawing a line from each point to another middle point of the triangle to generate four triangles.

41. The system of claim 40 wherein a three dimensional location of each point is obtained using the high resolution depth map.

42. The system of claim 37 wherein voxel information in a three dimensional space is obtained from the high resolution depth map.

* * * * *